United States Patent
Harris et al.

(10) Patent No.: US 10,144,327 B2
(45) Date of Patent: Dec. 4, 2018

(54) VEHICLE SEAT WITH A RECONFIGURABLE SIDE ARMREST

(71) Applicant: Toyota Motor Engineering & Manufacturing North America, Inc., Erlanger, KY (US)

(72) Inventors: Ryan C. Harris, Saline, MI (US); Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 109 days.

(21) Appl. No.: 15/411,185

(22) Filed: Jan. 20, 2017

(65) Prior Publication Data

US 2018/0208089 A1    Jul. 26, 2018

(51) Int. Cl.
*A47C 7/62*     (2006.01)
*B60N 2/75*     (2018.01)
*B60R 11/00*    (2006.01)

(52) U.S. Cl.
CPC ............ *B60N 2/793* (2018.02); *B60N 2/767* (2018.02); *B60R 11/00* (2013.01); *B60R 2011/0014* (2013.01); *B60R 2011/0085* (2013.01); *B60R 2011/0094* (2013.01)

(58) Field of Classification Search
CPC ......... B60N 2/793; B60N 2/767; B60R 11/00; B60R 2011/0014; B60R 2011/0085; B60R 2011/0094
USPC ............................. 297/188.14–188.17, 188.19
See application file for complete search history.

(56) References Cited

U.S. PATENT DOCUMENTS

| | | | | |
|---|---|---|---|---|
| 5,035,464 A | * | 7/1991 | Spallholtz | A47O 7/62 297/144 |
| 5,374,104 A | * | 12/1994 | Moore | A47O 7/72 297/188.16 |
| 5,393,124 A | | 2/1995 | Neil | |
| 5,752,683 A | * | 5/1998 | Novis | A47C 1/03 248/118 |
| 6,007,036 A | * | 12/1999 | Rosen | B60R 11/0235 224/281 |
| 6,032,027 A | * | 2/2000 | Loza | B60N 2/79 455/575.9 |

(Continued)

FOREIGN PATENT DOCUMENTS

FR      2805225 A1     8/2001

*Primary Examiner* — Mark R Wendell
(74) *Attorney, Agent, or Firm* — Christopher G. Darrow; Darrow Mustafa PC (57) ABSTRACT

A vehicle seat includes a seatback and a side armrest. The side armrest includes an elongate frame anchored to the seatback and an elongate cover supported on the frame. The frame includes a base segment, by which the frame is anchored to the seatback, and a pivoting distal segment. With the frame's base segment extending away from the seatback, the side armrest is reconfigurable between an armrest configuration and an auxiliary configuration. In the armrest configuration, the frame's distal segment is inline with its base segment, the cover covers the frame, and the cover is supported on the frame for sliding movement along the frame that culminates in lodgment onto its distal segment. In the auxiliary configuration, the cover is lodged onto the frame's distal segment, and the frame's distal segment is pivoted towards the seatback to position the cover to extend in front of the seatback.

20 Claims, 4 Drawing Sheets

(56) References Cited

U.S. PATENT DOCUMENTS

| | | | |
|---|---|---|---|
| 6,045,191 A | 4/2000 | Piretti | |
| 6,220,658 B1* | 4/2001 | Lukawski | A47C 7/70 |
| | | | 297/145 |
| 6,554,364 B1* | 4/2003 | Dammermann | A47C 1/03 |
| | | | 297/411.35 |
| 6,793,281 B2* | 9/2004 | Duerr | B60N 3/002 |
| | | | 297/147 |
| 7,478,867 B2* | 1/2009 | Weng | A47C 7/70 |
| | | | 297/161 |
| 8,070,224 B2* | 12/2011 | Vitito | B60R 11/02 |
| | | | 296/24.34 |
| 8,256,835 B2* | 9/2012 | Brink | A47C 7/70 |
| | | | 297/145 |
| 8,336,956 B2* | 12/2012 | Westerink | B64D 11/06 |
| | | | 108/44 |
| 2005/0140187 A1* | 6/2005 | Kordecki | A47C 7/70 |
| | | | 297/162 |
| 2006/0220425 A1* | 10/2006 | Becker | A47C 7/70 |
| | | | 297/188.16 |
| 2010/0244478 A1* | 9/2010 | DePue | B60N 3/101 |
| | | | 296/24.43 |
| 2015/0145272 A1 | 5/2015 | Cleary et al. | |

* cited by examiner

VEHICLE SEAT WITH A RECONFIGURABLE SIDE ARMREST

TECHNICAL FIELD

The embodiments disclosed herein generally relate to vehicle seats and, more particularly, to side armrests for vehicle seats.

BACKGROUND

The typical vehicle seat includes a base with a seat cushion, a seatback and a headrest. The seatback extends upright from the seat cushion to support a seated passenger's back, and the headrest extends upright from the seatback to support the seated passenger's head.

Many vehicle seats also include side armrests. Conventionally, the side armrests in these seats forwardly extend away from the seatback to support the seated passenger's arms.

SUMMARY

Disclosed herein are embodiments of a vehicle seat with a reconfigurable armrest, and a reconfigurable armrest for a vehicle seat.

In one aspect, a vehicle seat includes a seatback and a side armrest. The side armrest includes an elongate frame anchored to the seatback and an elongate cover supported on the frame. The frame includes a base segment, by which the frame is anchored to the seatback, and a pivoting distal segment. With the frame's base segment extending away from the seatback, the side armrest is reconfigurable between an armrest configuration and an auxiliary configuration. In the armrest configuration, the frame's distal segment is inline with its base segment, the cover covers the frame, and the cover is supported on the frame for sliding movement along the frame that culminates in lodgment onto its distal segment. In the auxiliary configuration, the cover is lodged onto the frame's distal segment, and the frame's distal segment is pivoted towards the seatback to position the cover to extend in front of the seatback.

In another aspect, a side armrest for a vehicle seat includes an elongate frame and an elongate, generally tubular cover supported on the frame. The frame includes a base segment and a pivoting distal segment. The cover has a proximal end from which a frame receiving recess opens and an exterior surface from which a carrier recess opens. The cover includes a carrier having a shelf that, at least in part, defines the carrier recess and configures the carrier to carry a personal object. The cover also includes a lid coupled to the remainder of the cover for movement between a closed position overlying the carrier recess contiguously with the exterior surface and an open position exposing the carrier recess. The side armrest is reconfigurable between an armrest configuration and an auxiliary configuration. In the armrest configuration, the frame's distal segment is inline with its base segment, the cover fully receives the frame in its frame receiving recess, and the cover is supported on the frame for sliding movement along the frame that culminates in the cover only receiving the frame's distal segment in its frame receiving recess and being lodged onto the frame's distal segment by its proximal end. In the auxiliary configuration, the cover only receives the frame's distal segment in its frame receiving recess and is lodged onto the frame's distal segment by its proximal end, and the frame's distal segment is pivoted at an approximately right angle to its base segment.

In yet another aspect, a side armrest for a vehicle seat includes an elongate frame and an elongate cover supported on the frame. The frame includes a base segment and a pivoting distal segment. The cover includes a carrier and at least one onboard personal electronic device output interface. The carrier has a shelf, and a lip and a spaced apart backstop that project from the shelf. The lip and the backstop define respective one or more touchpoints on either side of an upright plane for supporting a personal object carried by the shelf in an upright orientation in the upright plane. The at least one onboard personal electronic device output interface is subject to being powered, and is configured to support an electrical coupling with a personal electronic device in order to supply electrical power thereto. The side armrest is reconfigurable between an armrest configuration and an auxiliary configuration. In the armrest configuration, the frame's distal segment is inline with its base segment, the cover covers the frame, and the cover is supported on the frame for sliding movement along the frame that culminates in lodgment onto its distal segment. In the auxiliary configuration, the cover is lodged onto the frame's distal segment, and the frame's distal segment is pivoted at an approximately right angle to its base segment.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle seat with seatback and a reconfigurable side armrest anchored to the seatback. The side armrest is reconfigurable, beyond a conventional armrest configuration, to an auxiliary configuration. In the auxiliary configuration, the side armrest's cover is slid partway along its frame, and is pivotally positioned on the frame to transversely extend in front of the seatback. The cover features a carrier by which the cover may carry one or more personal objects. The cover also features one or more personal electronic device output interfaces so that, in cases where a carried personal object is a personal electronic device, it can be supplied with electrical power.

Figure 1:
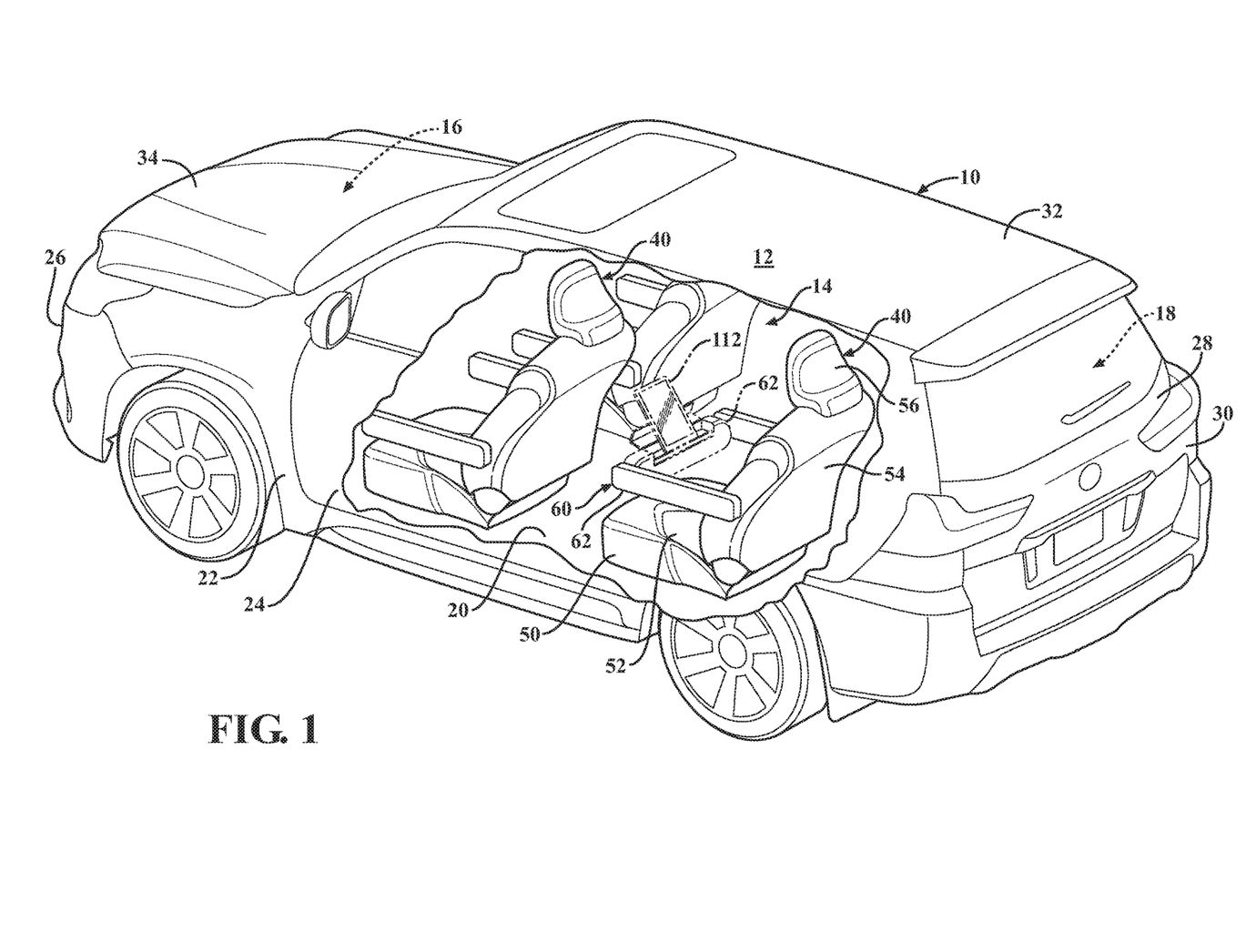
FIG. 1 is a partially broken away perspective view of a vehicle, showing a representative vehicle seat in its passenger compartment that includes a side armrest that is reconfigurable between an illustrated conventional armrest configuration, in which the side armrest is useful to support a seated passenger's arms, and an illustrated auxiliary configuration, in which the side armrest is useful as a hands-free rest for a seated passenger's personal objects.

A representative vehicle 10 is shown in FIG. 1. In this description, uses of "front," "forward" and the like, and uses of "rear," "rearward" and the like, refer to the longitudinal direction of the vehicle 10. "Front," "forward" and the like refer to the front (fore) of the vehicle 10, while "rear," "rearward" and the like refer to the back (aft) of the vehicle 10.

The vehicle 10 has an exterior 12 and a number of inner compartments. As shown, the inner compartments include a passenger compartment 14. In addition to the passenger compartment 14, the inner compartments may include an engine compartment 16 and a cargo area 18.

The vehicle 10 has a body that forms its exterior 12 and defines its interior compartments. The body has a floor 20, as well as upright sides 22 with doors 24, a front end 26, a rear end 28 with a lift gate 30, a roof 32 and a hood 34. The body also has a number of closure panels, such as the doors 24 and the lift gate 30. The doors 24 are connected to the remainder of the body at its upright sides 22, over the passenger compartment 14, for movement between a closed position and an open position permissive of ingress into or egress from the passenger compartment 14.

The vehicle 10 includes one or more vehicle seats 40 housed in its passenger compartment 14 and mounted to the floor 20. Where, as shown, the vehicle 10 includes multiple vehicle seats 40, the vehicle seats 40 may be arranged in a front row of vehicle seats 40 and a second row of vehicle seats 40. For purposes of discussion, the vehicle seats 40 are represented by a rear driver-side vehicle seat 40, with the understanding that its features may be implemented in one, some or all of the other vehicle seats 40 housed in the passenger compartment 14. In addition to the vehicle seats 40, the vehicle 10 may include a dash assembly housed in its passenger compartment 14 across the front row of vehicle seats 40.

The representative vehicle seat 40 includes a base 50, which itself includes a seat cushion 52, and a seatback 54 coupled to the base 50 at the rear of its seat cushion 52. In addition to the seat cushion 52, the base 50 may include mounting hardware for mounting the remainder of the vehicle seat 40 to the floor 20. The vehicle seat 40 further includes a headrest 56 coupled atop the seatback 54. The vehicle seat 40 is in a passenger carrying configuration where, as shown, its seatback 54 extends upright from the seat cushion 52 to support a seated passenger's back, and its headrest 56 extends upright from the seatback 54, in general alignment with the seatback 54, to support a seated passenger's head.

In addition to the base 50, the seatback 54 and the headrest 56, the vehicle seat 40 includes a pair of side armrests 60 coupled to respective sides of the seatback 54. For purposes of discussion, the pair of side armrests 60 is represented by a left-hand side armrest 60, with the understanding that its features may be implemented in the other, right-hand, side armrest 60.

The representative side armrest 60 is reconfigurable between a conventional armrest configuration and an auxiliary configuration through an intermediate configuration. In FIG. 1, the armrest configuration is rendered with solid lines and, for comparison, the auxiliary configuration is rendered with phantom lines.

The side armrest 60 includes, among other components, a cover 62. In the armrest configuration, the cover 62, and the side armrest 60 as a whole, forwardly extend away from the seatback 54. In the armrest configuration, the cover 62, in a conventional manner, is particularly useful to support a seated passenger's arms. In the auxiliary configuration, on the other hand, the cover 62 is positioned to transversely extend in front of the seatback 54. In the auxiliary configuration, the cover 62 is particularly useful as a hands-free rest for a seated passenger's personal objects.

Figure 2A:
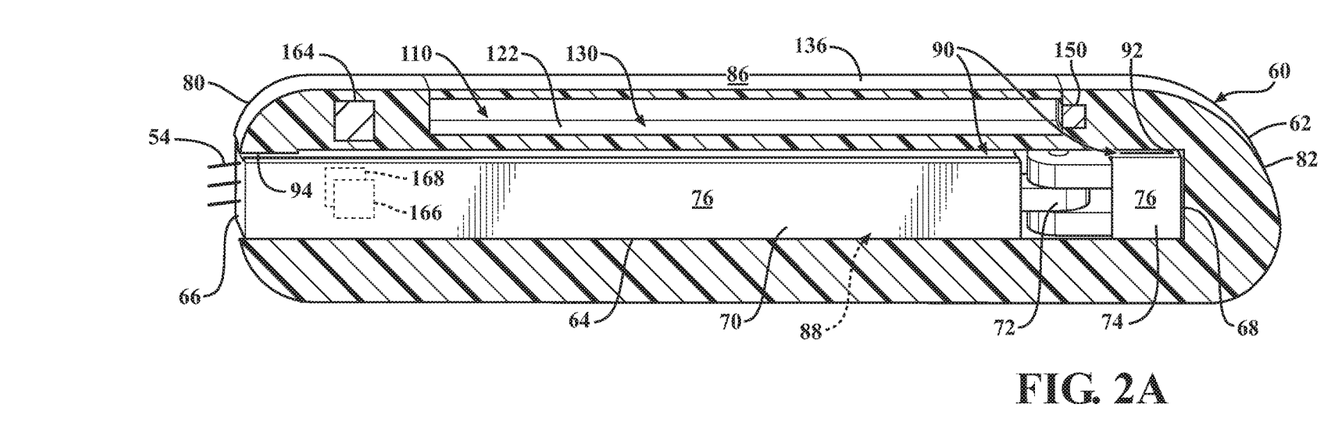
FIG. 2A is a partially broken away perspective view of the side armrest in the armrest configuration, showing a cover and a frame, and illustrating a relationship in which the frame supports the cover for sliding movement along the frame.
Figure 2B:
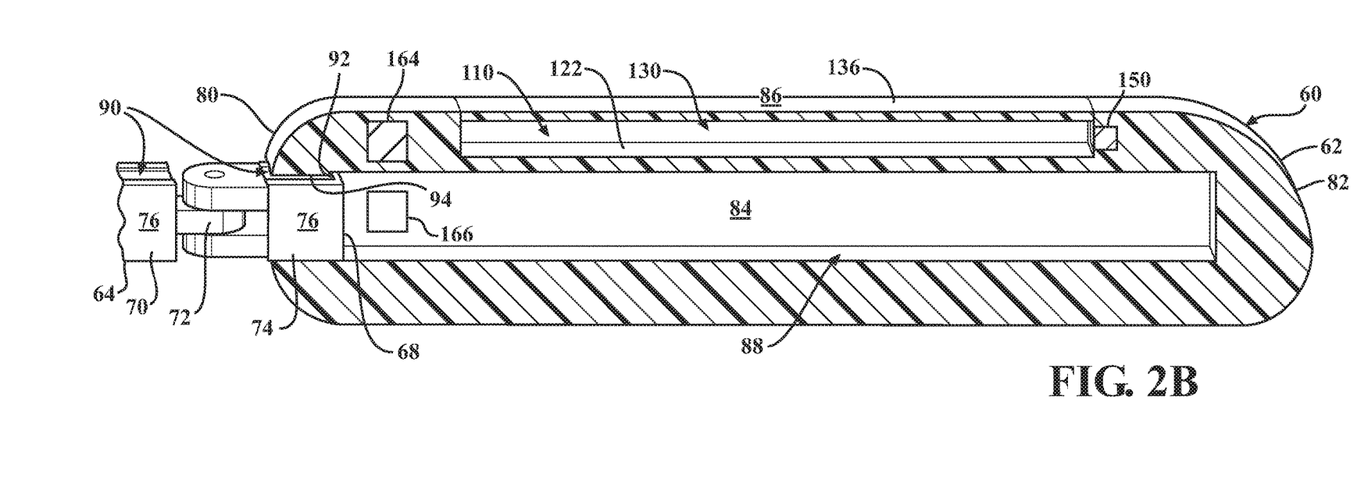
FIG. 2B is a partially broken away perspective view of the side armrest in an intermediate configuration between the armrest configuration and the auxiliary configuration, showing the cover and the frame, and illustrating a relationship in which the sliding movement of the cover along the frame has culminated with the cover's lodgment onto a pivoting distal segment of the frame.

As shown with additional reference to FIGS. 2A and 2B, in addition to the cover 62, the side armrest 60 includes a frame 64 on which the cover 62 is supported. In FIG. 2A, the side armrest 60 is in the armrest configuration, while in FIG. 2B, the side armrest 60 is in the intermediate configuration between the armrest configuration and the auxiliary configuration. The intermediate configuration prepares the armrest for reconfiguration to the auxiliary configuration from the armrest configuration, and for reconfiguration back to the armrest configuration from the auxiliary configuration.

The frame 64 is elongate, and has a proximal end 66 and a distal end 68. Along its length, the frame 64 includes a base segment 70 extending from its proximal end 66, a pivot joint 72 and a pivoting distal segment 74 extending from its distal end 68.

The base segment 70 and the distal segment 74 have respective exterior surfaces 76 as part of a larger exterior surface 76 of the frame 64. The base segment 70 and the distal segment 74 have generally matching cross sectional contours. These generally matching cross sectional contours, although shown as generally square, could be otherwise polygonal, circular or oblong, for example. In these or other configurations, the frame 64 is generally untapered along its length. The pivot joint 72 has a similar cross sectional contour as the generally matching cross sectional contours of the base segment 70 and the distal segment 74, and falls within their footprints.

At its proximal end 66, the frame 64 is coupled to the seatback 54 by the base segment 70. This coupling anchors the frame 64 and, by extension, the side armrest 60 as a whole, to the seatback 54 by the base segment 70. The base segment 70 may be pivotally coupled to the seatback 54 to allow the base segment 70 and the remainder of the side armrest 60 to upwardly pivot with respect to the seatback 54. However, for purposes of the armrest configuration, the intermediate configuration and the auxiliary configuration, the base segment 70 forwardly extends away from the seatback 54.

In both the armrest configuration and the intermediate configuration, with the base segment 70 forwardly extending away from the seatback 54, the distal segment 74 is in an inline position. In the inline position, the distal segment 74 is inline with the base segment 70 and, accordingly, forwardly extends away from the seatback 54 along with the base segment 70.

The cover 62, similarly to the frame 64, is elongate, and has a proximal end 80 and a distal end 82. The cover 62 may be, or include, any combination of structural members, upholstery and trimming.

Regardless of its construction, the cover 62 is generally tubular, with its components providing an interior surface 84 and a durable but attractive exterior surface 86. The interior surface 84 defines a frame receiving recess 88. The frame receiving recess 88 opens from the proximal end 80, and has a similar cross section as the generally matching cross sectional contours of the base segment 70 and the distal segment 74 of the frame 64. Depending upon these generally matching cross sectional contours, the cross section of the frame receiving recess 88 may be generally square, as shown, as well as otherwise polygonal, circular or oblong, for example. In these or other configurations, the frame receiving recess 88 is generally untapered along its length. The cross sectional contour of the exterior surface 86, although shown as generally rectangular, could be otherwise polygonal, circular or oblong, for example. In these or other configurations, the exterior surface 86 could be inwardly tapered or, as shown, generally untapered along its length.

As noted above, in the armrest configuration, both the base segment 70 and the distal segment 74 of the frame 64 forwardly extend away from the seatback 54, with the distal segment 74, in the inline position, being inline with the base segment 70. The cover 62, for its part, is in a cover position, in which it covers the frame 64. In the cover position, the cover 62 fully receives the frame 64, including both the base segment 70 and the distal segment 74 thereof, in its frame receiving recess 88. The proximal end 80 of the cover 62 is adjacent to the proximal end 66 of the frame 64, at which the frame 64 is coupled to the seatback 54 by its base segment 70. As a result, in the armrest configuration, both the frame 64 and the cover 62 and, by extension, the side armrest 60 as a whole, forwardly extend away from the seatback 54.

The base segment 70, the distal segment 74 and the pivot joint 72 of the frame 64 are part of a relationship in which the cover 62 is supported on the frame 64 for sliding movement along the frame 64. From the perspective of the armrest configuration, this sliding movement is forward sliding movement that commences with the proximal end 80 of the cover 62 forwardly moving away from the proximal end 66 of the frame 64. The culmination of this forward sliding movement realizes the intermediate configuration, in which the cover 62 is in a lodged position. In the lodged position, the cover 62 is lodged, by its proximal end 80, onto the distal segment 74 of the frame 64.

The cover 62 and the frame 64 are collaboratively configured for the forward sliding movement of the cover 62 along the frame 64. It the illustrated configuration of the frame 64, the base segment 70 and the distal segment 74 have their generally matching cross sectional contours, making the respective exterior surfaces 76 of the base segment 70 and the distal segment 74, as well as the larger exterior surface 76 of the frame 64, generally contiguous. In the illustrated configuration of the cover 62, its frame receiving recess 88 has a similar cross section as these generally matching cross sectional contours. With these configurations, one, some or, as shown, all of the surfaces of the larger interior surface 84, by which the frame receiving recess 88 of the cover 62 is defined, continuously bear upon the generally contiguous exterior surface 76 of the frame 64 in a manner permissive of the forward sliding movement of the cover 62 along the frame 64.

The cover 62, and particularly its proximal end 80, and the frame 64, and particularly its distal segment 74, are further collaboratively configured for the forward sliding movement of the cover 62 along the frame 64 to culminate with the cover 62 in the lodged position.

It the illustrated configuration of the frame 64, as part of its generally contiguous exterior surface 76, both its base segment 70 and its distal segment 74 define respective channels 90 along their lengths as part of a larger channel 90 defined along the length of the frame 64. This channel 90 may, as shown, be defined at the topside of the frame 64. The channel 90 of the distal segment 74 and, by extension, the channel 90 of the frame 64, is closed ended, with the distal segment 74 including a shoulder surface 92 across its own channel 90.

In the illustrated configuration of the cover 62, its frame receiving recess 88 has a complementary projection 94 at its proximal end 80 that projects from the remainder of the interior surface 84. With these configurations, the projection 94 of the frame receiving recess 88 continuously rides in the channel 90 of the frame 64 with the forward sliding movement of the cover 62 along the frame 64. At the culmination of this forward sliding movement, the projection 94 meets the shoulder surface 92 across the channel 90 of the distal segment 74 of the frame 64, and is retentively captured in the closed end of the channel 90. The cover 62, as a result, is in the lodged position, in which the cover 62 is lodged, by its proximal end 80, onto the distal segment 74 of the frame 64.

In the intermediate configuration, both the base segment 70 and the distal segment 74 of the frame 64 forwardly extend away from the seatback 54, with the distal segment 74, in the inline position, being inline with the base segment 70. The cover 62, as noted above, is in the lodged position. In the lodged position, the proximal end 80 of the cover 62 clears both the base segment 70 and the pivot joint 72 of the frame 64, and only receives the distal segment 74 of the frame 64 in its frame receiving recess 88. As a result, in the intermediate configuration, both the frame 64 and the cover 62 and, by extension, the side armrest 60 as a whole, still forwardly extend away from the seatback 54.

Figure 3:
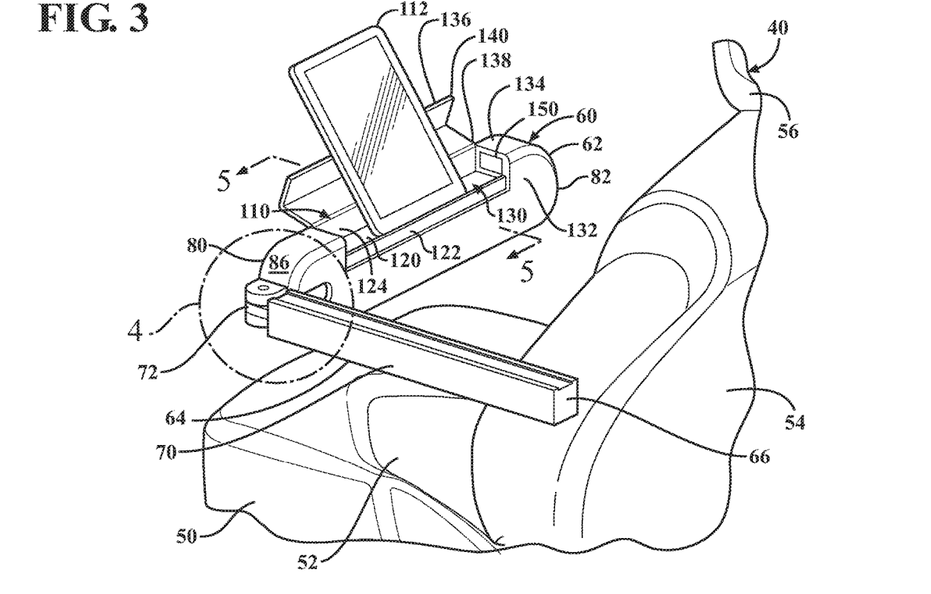
FIG. 3 is a perspective view of the vehicle seat when the side armrest is in the auxiliary configuration, showing the cover, the frame and a carrier, and illustrating the cover, when lodged onto the frame's distal segment, pivotally positioned to extend in front of the seatback via pivoting of the frame's distal segment, as well as the carrier supporting a seated passenger's personal electronic device in an upright orientation.
Figure 4:
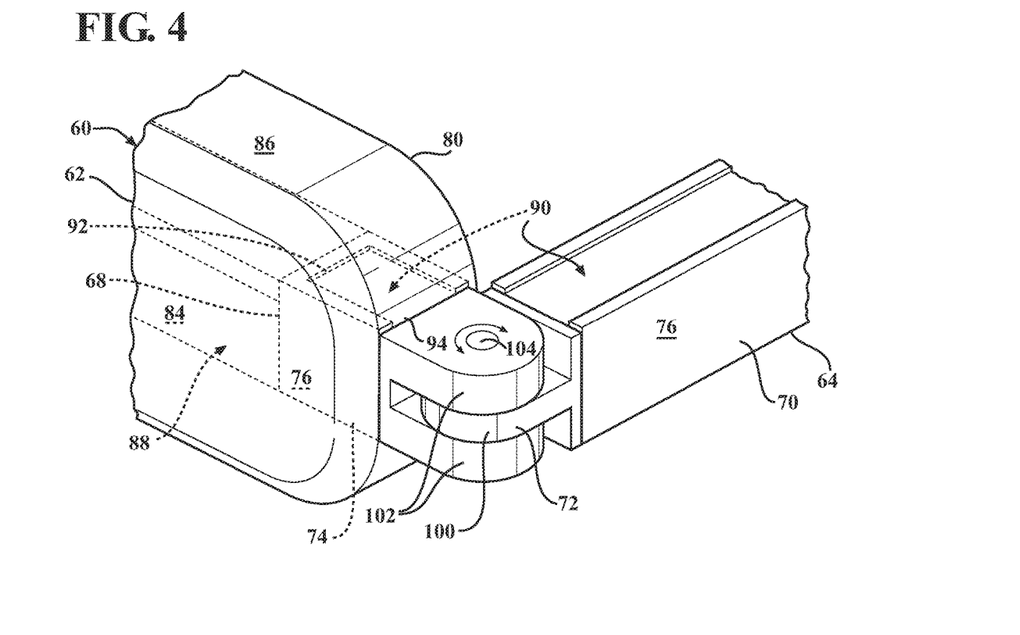
FIG. 4 is a detailed perspective view of the side armrest in the auxiliary configuration, showing details of a pivot joint by which the frame's distal segment pivots to pivotally position the cover to extend in front of the seatback.

As shown with additional reference to FIGS. 3 and 4, the pivot joint 72 of the frame 64 couples its base segment 70 and its distal segment 74 to one another. In FIGS. 3 and 4, the side armrest 60 is in the armrest configuration.

From the perspective of the intermediate configuration, with the base segment 70 of the frame 64 extending away from the seatback 54, the pivot joint 72 allows the distal segment 74 to rearwardly pivot with respect to the base segment 70 about an upright axis through the pivot joint 72. The distal segment 74, more specifically, rearwardly pivots between the inline position and a pivoted position, which realizes the auxiliary configuration. In the pivoted position, the distal segment 74 is rearwardly pivoted towards the seatback 54 at an approximately right angle to the base segment 70.

Where, as shown, the pivot joint 72 has a knuckle configuration, it may have one or more fingers 100 mounted to the base segment 70, one or more interleaved fingers 102 mounted to the distal segment 74, and an upright rod 104 extending though them. With this knuckle configuration, the fingers 100 mounted to the base segment 70 and the fingers 102 mounted to the distal segment 74 are pivotable with respect to each other about the rod 104. The rod 104, accordingly, defines the upright axis through the pivot joint 72 about which the distal segment 74 rearwardly pivots with respect to the base segment 70. In this and other configurations, the pivot joint 72 may include a stop mechanism configured to stop the distal segment 74 from rearwardly pivoting beyond the pivoted position. Either as part of or separately from this stop mechanism, the pivot joint 72 may include a lock mechanism configured to releasably lock the distal segment 74 in the inline position or the pivoted position, or both.

In the auxiliary configuration, while the base segment 70 of the frame 64 forwardly extends away from the seatback 54, its distal segment 74, in the pivoted position, is rearwardly pivoted towards the seatback 54. The cover 62 remains in the lodged position and, as a result, in the auxiliary configuration, the cover 62 is rearwardly pivotally positioned to transversely extend in front of the seatback 54.

The reconfiguration of the side armrest 60 from the armrest configuration to the auxiliary configuration through the intermediate configuration is described above from the successive perspectives of the armrest configuration and the intermediate configuration. It will be understood that the side armrest 60 is similarly reconfigurable from the auxiliary configuration back to the armrest configuration through the intermediate configuration.

As noted above, in the auxiliary configuration of the side armrest 60, the cover 62 is particularly useful as a hands-free rest for a seated passenger's personal objects. To further this usefulness, the cover 62 includes an integrated carrier 110.

The carrier 110 is configured to carry one or more personal objects. As shown, the carrier 110 is specially shaped and sized to carry, as a specific type of personal object, a personal electronic device (PED) 112. Although the PED 112 is represented by a tablet, the PED 112 could also be a smart phone, a gaming device or the like. Instead of being specially shaped and sized to carry the PED 112 or other specific type of personal object, the carrier 110 could be generically shaped and sized to carry a variety of different personal objects. In any event, the carrier 110 being specially shaped and sized to carry a specific type of personal object does not preclude the carrier 110 from being useful for carrying a variety of different personal objects. Similarly, the carrier 110 being generically shaped and sized to carry a variety of different personal objects does not preclude the carrier 110 from being useful for carrying a specific type of personal object.

Where, as shown, the carrier 110 is configured as a stand, the carrier 110, beyond being configured to carry one or more personal objects, may be further configured to support the carried personal objects in an upright orientation. In its configuration as a stand, in the case where the carrier 110 is specially shaped and sized to carry the PED 112 or other specific type of personal object, the carrier 110 may additionally be specially shaped and sized to support the carried specific type of personal object in an upright orientation. Once again, the carrier 110 being specially shaped and sized to support the carried specific type of personal object in an upright orientation does not preclude the carrier 110 from being useful for supporting a variety of different carried personal objects in an upright orientation.

Figure 5:
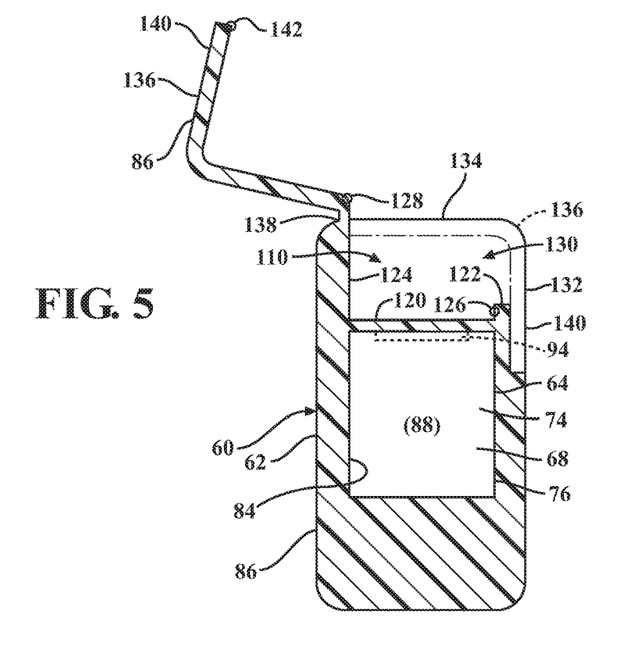
FIG. 5 is a cross sectional view of the side armrest along the line 5-5 in FIG. 3, showing details of the carrier.

As shown with additional reference to FIG. 5, in its configuration as a stand, the carrier 110 includes a shelf 120, as well as a lip 122 and a spaced apart backstop 124 that both project from the shelf 120. With the side armrest 60 in the auxiliary configuration, in which the cover 62 transversely extends in front of the seatback 54, the shelf 120 is generally horizontal, while the lip 122 and the backstop 124 are both upright. With the lip 122 defining one or more base touchpoints 126, the backstop 124 projects from the shelf 120 above the lip 122, and defines one or more upper touchpoints 128 on the other side of an imaginary upright plane as the base touchpoints 126. With the backstop 124 being spaced apart from the lip 122, this upright plane may be canted away from a seated passenger. In addition to being configured to carry the PED 112 via the shelf 120, the carrier 110 is configured to support the PED 112 in an upright orientation in the upright plane via the lip 122 and the backstop 124 and, more specifically, their respective base touchpoints 126 and upper touchpoints 128. As a result, a seated passenger is benefited by being able to read, operate and otherwise use the PED 112 without having to separately use their hands to carry the PED 112 and support it in an upright orientation.

Where, as shown, the carrier 110 is recessed into the remainder of the cover 62, it may be integrated into the cover 62 as part of a carrier recess 130 that opens from its exterior surface 86. In the recessed configuration of the carrier 110, the carrier recess 130 is defined by the shelf 120 of the carrier 110, either alone or in combination with its lip 122 and backstop 124. The shelf 120 of the carrier 110 and, optionally, its lip 122 and backstop 124, accordingly fall within the footprint of the surrounding cross sectional contour of the exterior surface 86 of the cover 62.

The carrier recess 130 opens into an inside face 132 and an adjacent topside face 134 of the cover 62. With the side armrest 60 in the auxiliary configuration, in which the cover 62 transversely extends in front of the seatback 54, the inside face 132 of the cover 62 faces a seated passenger, and its topside face 134 forms its crown. With the carrier 110 integrated into the cover 62 as part of the carrier recess 130, the shelf 120 of the carrier 110, together with its lip 122 and backstop 124, defines the carrier recess 130. With the carrier recess 130 opening into the inside face 132 of the cover 62, the lip 122 of the carrier 110 defines the carrier recess 130 at its junction with the inside face 132 of the cover 62. To further define the carrier recess 130, the shelf 120 of the carrier 110 extends from the inside face 132 of the cover 62, and the backstop 124 of the carrier 110 extends from the topside face 134 of the cover 62. The upper touchpoints 128 are, as shown, defined by the backstop 124 of the carrier 110 at the junction of the carrier recess 130 and the topside face 134 of the cover 62.

In the recessed configuration of the carrier 110, the cover 62 has, either as part of or separately from its carrier 110, a lid 136 for its carrier recess 130. The lid 136 is coupled to the remainder of the cover 62, over the carrier recess 130, for movement between a closed position and an open position. In FIG. 5, the closed position is rendered with phantom lines, and the open position is rendered with solid lines. In the closed position, the lid 136 overlies the carrier recess 130, and in the open position, the lid 136 exposes the underlying carrier recess 130 for access. In the closed position, by overlying the carrier recess 130, the lid 136 overlies any parts of the carrier 110 defining the carrier recess 130, such as its shelf 120, as well as its lip 122 and backstop 124. On the other hand, in the open position, by exposing the underlying carrier recess 130, the lid 136 exposes these parts of the carrier 110.

In the closed position, the lid 136 extends between the junction of the carrier recess 130 and the inside face 132 of the cover 62, where the carrier recess 130 is defined by the lip 122 of the carrier 110, and the junction of the carrier recess 130 and the topside face 134 of the cover 62, from which the shelf 120 of the carrier 110 extends to define the carrier recess 130. The lid 136, moreover, spans the carrier recess 130. The lid 136 has an exterior surface 86 as part of the larger exterior surface 86 of the cover 62. The exterior surface 86 of the lid 136 has a similar cross sectional contour as the surrounding cross sectional contour of the exterior surface 86 of the cover 62. Accordingly, with the lid 136 in the closed position, the exterior surface 86 of the cover 62 is contiguous notwithstanding the underlying carrier recess 130 and the lid 136.

The lid 136 is coupled to the remainder of the cover 62 by a hinge 138. Although the hinge 138, as shown, is a living hinge, the hinge 138 could have other mechanical hinge configurations. The hinge 138 couples the lid 136 to the remainder of the cover 62 along the junction of the carrier recess 130 and the topside face 134 of the cover 62. In the closed position, a free end 140 of the lid 136, which opposes the hinge 138, extends along the junction of the carrier recess 130 and the inside face 132 of the cover 62 and, accordingly, the lip 122 of the carrier 110. With the side armrest 60 in the auxiliary configuration, in which the cover 62 transversely extends in front of the seatback 54, the hinge 138 allows the lid 136 to upwardly and forwardly pivot with respect to the remainder of the cover 62 from the closed position to the open position.

In addition to being integrated into the cover 62 as part of the carrier recess 130, the carrier 110 is, as shown, integrated into the cover 62 as part of the lid 136. In the open position, the free end 140 of the lid 136 defines one or more additional upper touchpoints 142 on the same side of the upright plane as upper touchpoints 128 defined by the backstop 124. With this backstop extension configuration of the lid 136, the carrier 110 is configured to support the PED 112 in an upright orientation in the upright plane via the lip 122 and its base touchpoints 126, on the one hand, and the backstop 124 and the lid 136, and their respective upper touchpoints 128 and 142, on the other hand.

As noted above, in the armrest configuration, the cover 62 is in the cover position, in which it fully receives the frame 64 in its frame receiving recess 88. Moreover, in the recessed configuration of the carrier 110, with the lid 136 in the closed position, the exterior surface 86 of the cover 62 is contiguous. As a result, in the armrest configuration, the side armrest 60 has an overall nondescript and conventional appearance. This appearance, and the usefulness of the cover 62 to support a seated passenger's arms in a conventional manner in the armrest configuration, are not disturbed by the additional usefulness of the cover 62 as a hands-free rest for a seated passenger's personal objects in the auxiliary configuration.

To further the usefulness of the cover 62 as a hands-free rest for a seated passenger's personal objects even more in the case where the carrier 110 is specially shaped and sized to carry the PED 112, and support the PED 112 in an upright orientation, the cover 62 includes one or more PED output interfaces 150.

The PED output interfaces 150 are, as shown, installed onboard the cover 62. Generally speaking, the PED output interfaces 150 are configured to support electrical couplings with PEDs carried by the carrier 110, such as the representative PED 112. When the PED output interfaces 150 are powered, these electrical couplings facilitate the supply of electrical power from the PED output interfaces 150 to the PED 112.

The PED output interfaces 150 may be any combination of devices that support conductive or inductive electrical couplings with the PED 112. In the case of conductive electrical couplings, the PED output interfaces 150 could include one or more electrical sockets, charging docks and charging ports, such as USB charging ports and the like, for example. In the case of inductive electrical couplings, the PED output interfaces 150 could include one or more inductive pads, for example.

To facilitate the requisite electrical couplings with the PED 112, the PED output interfaces 150 may be located anywhere on the cover 62 subject to access by a seated passenger. The PED output interfaces 150 may, for instance, be located on a part of the carrier 110. In the recessed configuration of the carrier 110, the PED output interfaces 150 may be located on a part of the carrier 110 defining the carrier recess 130, such as the shelf 120 of the carrier 110, its lip 122 or backstop 124 or, as shown, another surface defining the carrier recess 130. Alternatively, or additionally, the PED output interfaces 150 could be located on the exterior surface 86 of the cover 62.

Figure 6:
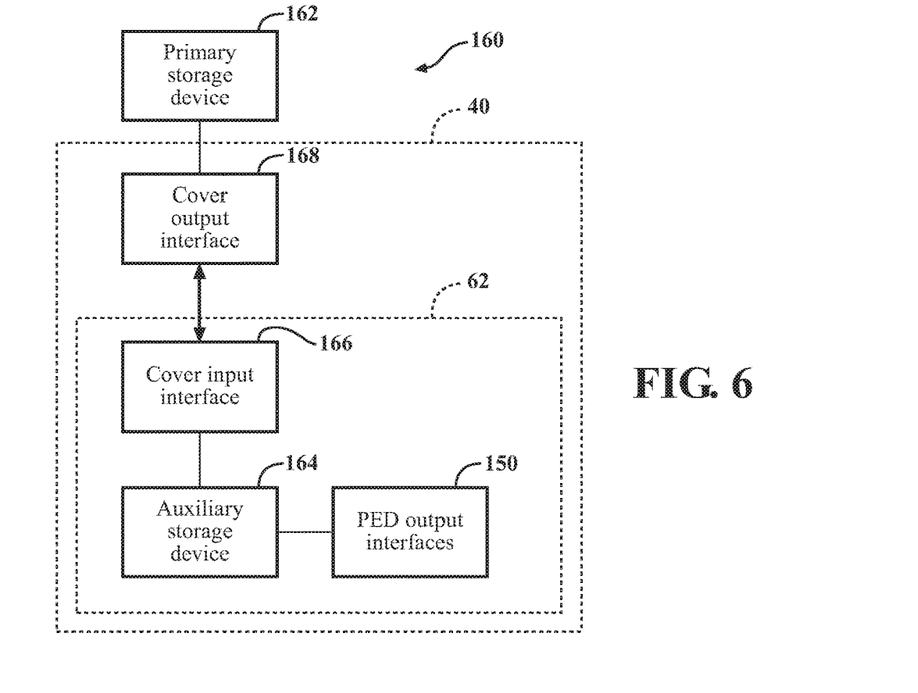
FIG. 6 is a schematic block diagram of an electrical system for the vehicle, including PED output interfaces configured to support an electrical coupling with the seated passenger's personal electronic device so that it can be supplied with electrical power.

As shown with additional reference to FIG. 6, the PED output interfaces 150 are part of an electrical system 160 for the vehicle 10. In addition to the PED output interfaces 150, the electrical system 160 includes a primary storage device 162. The primary storage device 162 represents the energy reserves from which electrical power is drawn to support the general operation of the vehicle 10. The primary storage device 162 may be, or include, any combination of one or more batteries, one or more capacitors or other devices configured for storing energy. The primary storage device 162 may be installed to the vehicle 10 within its engine compartment 16 or at its undercarriage, or both, for instance.

The electrical system 160, among other things, is configured to power the PED output interfaces 150 using electrical power drawn from the primary storage device 162. The electrical system 160 could include the requisite componentry to maintain fulltime electrical couplings between the primary storage device 162 and the PED output interfaces 150. In these implementations, the electrical system 160 supports the concurrent draw of electrical power from the primary storage device 162 and use thereof to power the PED output interfaces 150 regardless of the configuration of the side armrest 60.

However, during the reconfiguration the side armrest 60 between the armrest configuration and the auxiliary configuration, the side armrest 60, and particularly the cover 62 to which the PED output interfaces 150 are installed, is subject to compound movement with respect to the seatback 54 and the remainder of the vehicle seat 40. This movement could create complications related to maintaining fulltime electrical couplings between the primary storage device 162 and the PED output interfaces 150.

To avoid these related complications, the electrical system 160 includes a rechargeable auxiliary storage device 164 installed onboard the cover 62. The auxiliary storage device 164 is subject to charging or, in other words, is configured to store energy, in response to electrical power. The auxiliary storage device 164 is electrically connected to the PED output interfaces 150 and, when charged, powers the PED output interfaces 150. Similarly to the primary storage device 162, the auxiliary storage device 164 may be, or include, any combination of one or more batteries, one or more capacitors or other devices configured for storing energy.

The electrical system 160 supports the draw of electrical power from the primary storage device 162 and use thereof to charge the auxiliary storage device 164. In addition to these components, the electrical system 160 includes a cover input interface 166 installed onboard the cover 62, and a complimentary cover output interface 168 installed to the remainder of the vehicle seat 40. The cover input interface 166 is electrically connected to the auxiliary storage device 164, while the cover output interface 168 is electrically connected to the primary storage device 162.

Together, when the side armrest 60 is in the armrest configuration, the cover input interface 166 and the cover output interface 168 are configured to support an electrical coupling between one another and, by extension, between the primary storage device 162 and the auxiliary storage device 164. With the cover input interface 166 installed onboard the cover 62, the cover output interface 168 is installed to the frame 64, the seatback 54 or otherwise to the remainder of the vehicle seat 40 for alignment with the cover input interface 166 when the side armrest 60 is in the armrest configuration. Where, as shown best in FIG. 2A, the cover input interface 166 is installed onboard the cover 62, at is proximal end 80, the cover output interface 168 may be installed at the adjacent proximal end 66 of the frame 64, to its base segment 70. In these and other implementations, the cover input interface 166 and the cover output interface 168 may support conductive or inductive electrical couplings between one another.

When the side armrest 60 is in the armrest configuration, with the cover input interface 166 and the cover output interface 168 supporting an electrical coupling between one another, electrical power is drawn from the primary storage device 162 and used to charge the auxiliary storage device 164. The auxiliary storage device 164 stores energy in response to the electrical power and, as a result, is charged. With the auxiliary storage device 164 charged, it powers the PED output interfaces 150 which, in turn, may be used to supply electrical power to the PED 112, notwithstanding subsequent reconfiguration of the side armrest 60 from the armrest configuration to the auxiliary configuration. Accordingly, instead of having to maintain fulltime electrical couplings between the primary storage device 162 and the PED output interfaces 150, the powering of the PED output interfaces 150 using electrical power drawn from the primary storage device 162 is achieved with the more manageable part-time electrical coupling between the cover input interface 166 and the cover output interface 168 when the side armrest 60 is in the armrest configuration.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle seat, comprising:
a seatback; and
a side armrest, the side armrest including an elongate frame anchored to the seatback and an elongate cover supported on the frame, the frame including a base segment, by which the frame is anchored to the seatback, and a pivoting distal segment; wherein
with the frame's base segment extending away from the seatback, the side armrest is reconfigurable between an armrest configuration, in which the frame's distal segment is inline with its base segment, the cover covers the frame, and the cover is supported on the frame for sliding movement along the frame that culminates in lodgment onto its distal segment, and an auxiliary configuration, in which the cover is lodged onto the frame's distal segment, and the frame's distal segment is pivoted towards the seatback to position the cover to extend in front of the seatback.

2. The vehicle seat of claim 1, wherein the cover includes a carrier configured to carry a personal object.

3. The vehicle seat of claim 1, wherein the cover includes a carrier configured to carry a personal object and support it in an upright orientation.

4. The vehicle seat of claim 1, wherein the carrier has a shelf, and a lip and a spaced apart backstop that project from the shelf that, at least in part, configure the carrier to carry a personal object and support it in an upright orientation.

5. The vehicle seat of claim 4, wherein the lip and the backstop define respective one or more touchpoints on either side of an upright plane for supporting a carried personal object in an upright orientation in the upright plane.

6. The vehicle seat of claim 1, wherein the cover has a frame receiving recess and, in the armrest configuration, the cover fully receives the frame in the frame receiving recess.

7. The vehicle seat of claim 1, wherein the cover includes at least one onboard personal electronic device output interface, the at least one onboard personal electronic device output interface subject to being powered, and configured to support an electrical coupling with a personal electronic device in order to supply electrical power thereto.

8. The vehicle seat of claim 7, wherein the cover includes a rechargeable onboard auxiliary storage device electrically connected to, and configured to power, the at least one onboard personal electronic device output interface, and an onboard cover input interface electrically connected to the onboard auxiliary storage device, and configured to support the draw of electrical power from beyond the cover for charging the onboard auxiliary storage device.

9. A side armrest for a vehicle seat, comprising:
an elongate frame including a base segment and a pivoting distal segment; and
an elongate, generally tubular cover supported on the frame, the cover having a proximal end from which a frame receiving recess opens and an exterior surface from which a carrier recess opens, and including a carrier having a shelf that, at least in part, defines the carrier recess and configures the carrier to carry a personal object, and a lid coupled to the remainder of the cover for movement between a closed position overlying the carrier recess contiguously with the exterior surface and an open position exposing the carrier recess; wherein
the side armrest is reconfigurable between an armrest configuration, in which the frame's distal segment is inline with its base segment, the cover fully receives the frame in its frame receiving recess, and the cover is supported on the frame for sliding movement along the frame that culminates in the cover only receiving the frame's distal segment in its frame receiving recess and being lodged onto the frame's distal segment by its proximal end, and an auxiliary configuration, in which the cover only receives the frame's distal segment in its frame receiving recess and is lodged onto the frame's distal segment by its proximal end, and the frame's distal segment is pivoted at an approximately right angle to its base segment.

10. The side armrest of claim 9, wherein the carrier has a lip that projects from the shelf and, at least in part, defines the carrier recess and configures the carrier to support a carried personal object in an upright orientation.

11. The side armrest of claim 9, wherein the carrier has a lip and a spaced apart backstop that project from the shelf and, at least in part, define the carrier recess and configure the carrier to support a carried personal object in an upright orientation.

12. The side armrest of claim 11, wherein the lip and the backstop define respective one or more touchpoints on either side of an upright plane for supporting a carried personal object in an upright orientation in the upright plane.

13. The side armrest of claim 9, wherein:
the carrier has a lip that projects from the shelf and, at least in part, defines the carrier recess and, when the lid is in the open position, a free end of the lid; and
when the lid is in the open position, the lip and the free end of the lid, at least in part, configure the carrier to support a carried personal object in an upright orientation.

14. The side armrest of claim 13, wherein when the lid is in the open position, the lip and the free end of the lid define respective one or more touchpoints on either side of an upright plane for supporting a carried personal object in an upright orientation in the upright plane.

15. The side armrest of claim 9, wherein the frame's distal segment defines a channel with a closed end, and the cover's frame receiving recess has a complementary projection at the proximal end of the cover, the sliding movement of the cover along the frame including the projection continuously riding in the channel, and culminating in the projection being retentively captured in the closed end of the channel to lodge the cover onto the frame's distal segment by its proximal end.

16. The side armrest of claim 9, wherein the cover includes at least one onboard personal electronic device output interface, the at least one onboard personal electronic device output interface subject to being powered, and configured to support an electrical coupling with a personal electronic device in order to supply electrical power thereto.

17. The side armrest of claim 16, wherein the at least one onboard personal electronic device output interface is located on a surface defining the carrier recess.

18. The side armrest of claim 16, wherein the cover includes a rechargeable onboard auxiliary storage device electrically connected to, and configured to power, the at least one onboard personal electronic device output interface, and an onboard cover input interface electrically connected to the onboard auxiliary storage device, and configured to support the draw of electrical power from beyond the cover for charging the onboard auxiliary storage device.

19. A side armrest for a vehicle seat, comprising:
an elongate frame including a base segment and a pivoting distal segment; and
an elongate cover supported on the frame, the cover including:
a carrier, the carrier having a shelf, and a lip and a spaced apart backstop that project from the shelf, the lip and the backstop defining respective one or more touchpoints on either side of an upright plane for supporting a personal object carried by the shelf in an upright orientation in the upright plane; and
at least one onboard personal electronic device output interface, the at least one onboard personal electronic device output interface subject to being powered, and configured to support an electrical coupling with a personal electronic device in order to supply electrical power thereto; wherein
the side armrest is reconfigurable between an armrest configuration, in which the frame's distal segment is inline with its base segment, the cover covers the frame, and the cover is supported on the frame for sliding movement along the frame that culminates in lodgment onto its distal segment, and an auxiliary configuration, in which the cover is lodged onto the frame's distal segment, and the frame's distal segment is pivoted at an approximately right angle to its base segment.

20. The side armrest of claim 19, wherein the cover includes a rechargeable onboard auxiliary storage device electrically connected to, and configured to power, the at least one onboard personal electronic device output interface, and an onboard cover input interface electrically connected to the onboard auxiliary storage device, and configured to support the draw of electrical power from beyond the cover for charging the onboard auxiliary storage device.

* * * * *